US007768453B2

(12) United States Patent
Mason et al.

(10) Patent No.: US 7,768,453 B2
(45) Date of Patent: Aug. 3, 2010

(54) DYNAMICALLY CORRECTING THE CALIBRATION OF A PHASED ARRAY ANTENNA SYSTEM IN REAL TIME TO COMPENSATE FOR CHANGES OF ARRAY TEMPERATURE

(75) Inventors: James S. Mason, Richardson, TX (US); James S. Wilson, Hurst, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/188,513

(22) Filed: Aug. 8, 2008

(65) Prior Publication Data

US 2010/0033375 A1 Feb. 11, 2010

(51) Int. Cl.
*H01Q 3/00* (2006.01)
*G01S 7/40* (2006.01)

(52) U.S. Cl. ........................ 342/368; 342/174; 342/372

(58) Field of Classification Search ................. 342/165, 342/174, 368, 372, 373
See application file for complete search history.

(56) References Cited

U.S. PATENT DOCUMENTS

| | | | | |
|---|---|---|---|---|
| 5,072,228 | A | 12/1991 | Kuwahara | |
| 6,172,642 | B1 * | 1/2001 | DiDomenico et al. | 342/368 |
| 6,806,844 | B2 | 10/2004 | Azuma | 343/853 |
| 6,870,878 | B1 | 3/2005 | Doi et al. | 375/226 |
| 7,039,016 | B1 | 5/2006 | Lindskog et al. | 370/252 |
| 7,205,936 | B2 | 4/2007 | Park et al. | 342/368 |
| 7,304,605 | B2 | 12/2007 | Wells | 342/357.02 |
| 7,362,266 | B2 | 4/2008 | Collinson | 342/372 |
| 2002/0093453 | A1 | 7/2002 | Vail et al. | |
| 2007/0121103 | A1 | 5/2007 | Salmon | |

FOREIGN PATENT DOCUMENTS

WO WO 2005/116679 A1 8/2005

OTHER PUBLICATIONS

Notification of Transmittal of the International Search Report and the Written Opinion of the International Searching Authority or the Declaration, International Application No. PCT/US2009/052907, Filing Date Jun. 8, 2009, 12 pages, Oct. 14, 2009.

* cited by examiner

*Primary Examiner*—Dao L Phan
(74) *Attorney, Agent, or Firm*—Baker Botts L.L.P.

(57) ABSTRACT

Adjusting a calibrated phased array includes receiving conditions data describing conditions at a phased array. The phased array comprises antenna element sets, where an antenna element set comprises antenna elements and is associated with a calibration value. The following is performed for each antenna element set. A temperature value is established for an antenna element set according to the conditions data. A temperature-dependent correction value corresponding to the temperature value is established. A correction value is determined for the antenna element set according to the temperature-dependent correction value and the calibration value associated with the each antenna element set. At least one antenna element of the antenna element set is adjusted according to the correction value.

20 Claims, 3 Drawing Sheets

DYNAMICALLY CORRECTING THE CALIBRATION OF A PHASED ARRAY ANTENNA SYSTEM IN REAL TIME TO COMPENSATE FOR CHANGES OF ARRAY TEMPERATURE

TECHNICAL FIELD

This invention relates generally to the field of antenna systems and more specifically to dynamically correcting the calibration of a phased array antenna system in real time to compensate for changes of array temperature.

BACKGROUND

A phased array includes an array of antenna elements that produce a radiation pattern. The relative phases and amplitudes of signals feeding the antenna elements may be varied to steer the pattern in a particular direction.

In certain situations, a temperature change may affect the operation of the antenna elements and the element path, which also may affect the resulting radiation pattern. Known techniques for addressing this problem include using a cooling system to stabilize the temperature of the antenna elements. Cooling systems, however, typically require a relatively large amount of space and/or power and may be quite complex. In addition, cooling systems may not be able to quickly respond to rapidly heating antenna elements or to effectively minimize the temperature gradient across an array that is experiencing non-uniform heating.

SUMMARY OF THE DISCLOSURE

In accordance with the present invention, disadvantages and problems associated with previous techniques for adjusting a calibrated phased array may be reduced or eliminated.

According to one embodiment of the present invention, adjusting a calibrated phased array includes receiving conditions data describing conditions at a phased array. The phased array comprises antenna element sets, where an antenna element set comprises antenna elements and is associated with a calibration value. The following is performed for each antenna element set. A temperature value is established for an antenna element set according to the conditions data. A temperature-dependent correction value corresponding to the temperature value is established. A correction value is determined for the antenna element set according to the temperature-dependent correction value and the calibration value associated with the each antenna element set. At least one antenna element of the antenna element set is adjusted according to the correction value.

Certain embodiments of the invention may provide one or more technical advantages. A technical advantage of one embodiment may be that calibrated antenna elements of a phased array may be adjusted in accordance with current conditions at the phased array. In the embodiment, the conditions may include the temperature of the antenna elements. The temperature may be predicted from a model of the phased array and/or may be measured using a sensor sensing the phased array.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figure 1:
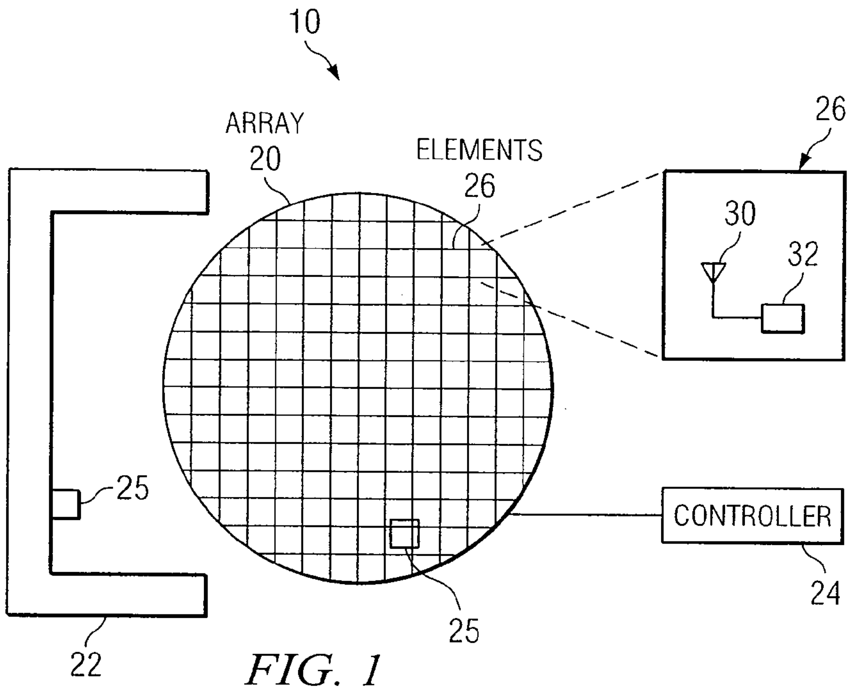
FIG. 1 illustrates one embodiment of a phased array antenna system that may be used to transmit and/or receive signals.

FIG. 1 illustrates one embodiment of a phased array antenna system 10 that may be used to transmit and/or receive signals. According to the embodiment, the phase and amplitude of signals communicated through the antenna elements of phased array antenna system 10 may have phase and amplitude errors that affect the beam steering accuracy of system 10. Array calibration is performed to determine calibration values that can be used to compensate for these errors. In one embodiment, the calibration values may be collected over a period of time when the array is in a low powered steady state condition that represents the start-up conditions of the array.

In certain situations, phased array antenna system 10 may experience temperature changes that affect beam steering accuracy. For example, phased array antenna system 10 may not have a stable operating temperature. During operation, phased array antenna system 10 may experience rapid unpredictable changes of temperature, sometimes of more than 100° C. Moreover, these temperature changes may not be uniform across the array. The changes may be due to, for example, internal and/or external sources of heat or the operating mode of the array. In one embodiment, the calibrated antenna elements of phased array antenna system 10 may be adjusted in accordance with current conditions to take into the account these temperature changes.

Phased array antenna system 10 may represent an antenna system operable for radar modes or to transmit and/or receive signals communicating information. Information may refer to voice, data, text, audio, video, multimedia, control, signaling, other information, or any combination of any of the preceding.

According to the illustrated embodiment, phased array antenna system 10 includes a phased array 20, a radome 22, and a controller 24. Phased array 20 may represent an array of antenna elements 26 that transmit and/or receive signals. An antenna element 26 may include a radiating element 30 and a transmit/receive (T/R) module 32. T/R function 32 sends signals to radiating element 30 for transmission and/or receives signals received by radiating element 30. In certain embodiments, T/R functions 32 may be coupled to an array manifold to distribute or collect the signals. The manifold network, however, may contribute to amplitude and phase errors associated with each element path.

T/R functions 32 may include any suitable channel components for sending and/or receiving signals. Examples of channel components include a power amplifier, a low noise amplifier, a phase shifter, a circulator, a driver, attenuator, and/or other components. In certain embodiments, the components may comprise semi-conductor devices, such as microwave monolithic integrated circuits (MMICs).

T/R functions 32 may control features of signals feeding radiating elements 30 in order to direct the effective radiation pattern of phased array 20. The pattern may be directed by reinforcing the radiation pattern in desired directions and suppressing the radiation pattern in undesired directions. A single feature may refer to any suitable feature of a signal, for example, a phase or an amplitude. The phase may refer to a relative phase between signals, and the amplitude may refer to a relative amplitude between signals. According to one embodiment, an attenuator may be used to adjust the signal amplitude or channel gain, and a phase shifter may be used to adjust the signal phase.

According to certain embodiments, system 10 may be located at (such as within) a projectile, such as a missile. In these embodiments, the operating duration of phased array 20 may be relatively short, for example, 10 to 20 seconds, with a great increase in temperature (due to, for example, aerodynamic heating), for example, more than 100 to 200 degrees Celsius. The rate of temperature change maybe dependent on the operation modes of the array. Moreover, the temperature increase may be non-uniform over phased array 20.

Controller 24 may adjust calibrated antenna elements 26 in accordance with current conditions at phased array 20. According to one embodiment, calibrated antenna elements 26 may be adjusted in accordance with the temperature at phased array 20. According to the embodiment, controller 24 may receive conditions data that describes the conditions at phased array 20, such as temperature measured by temperature sensors 25. The conditions data may include temperature-affecting parameters. Controller 24 may establish a current or future temperature value for each of one or more antenna elements from the conditions data. Controller 24 may determine a correction value for each temperature value, and may adjust the antenna elements using the correction values.

Modifications, additions, or omissions may be made to system 10 without departing from the scope of the invention. The components of system 10 may be integrated or separated. Moreover, the operations of system 10 may be performed by more, fewer, or other components. For example, the operations of controller 24 may be performed by more than one component. Additionally, operations of system 10 may be performed using any suitable logic. As used in this document, “each” refers to each member of a set or each member of a subset of a set.

Figure 2:
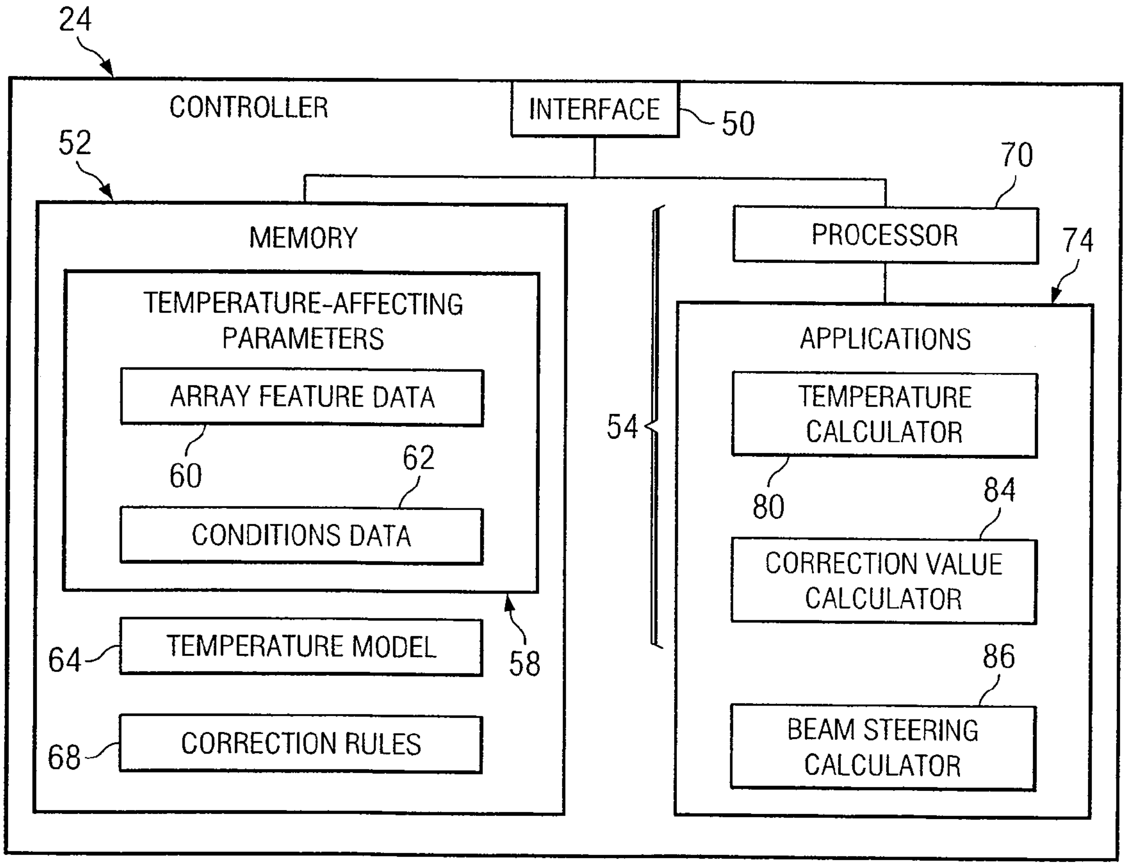
FIG. 2 illustrates one embodiment of a controller that may be used with the system of FIG. 1.

FIG. 2 illustrates one embodiment of controller 24 that may be used with system 10 of FIG. 1. According to the illustrated embodiment, controller 24 may include an interface 50, a memory 52, and logic 54. Interface 50 may receive input, send output, process the input and/or output, and/or perform other suitable operation. An interface may comprise one or more ports and/or conversion software. Memory 52 may store information, and may comprise one or more of any of the following: a Random Access Memory (RAM), a Read Only Memory (ROM), a magnetic disk, a Compact Disk (CD), a Digital Video Disk (DVD), a media storage, and/or any other suitable information storage medium.

According to the illustrated embodiment, memory 52 may include temperature-affecting parameters 58, temperature model 64, and correction rules 68. Temperature-affecting parameters 58 describe conditions that may affect the temperature of antenna elements 26. Temperature-affecting parameters 58 may include array feature data 60 and conditions data 62.

Array feature data 60 may describe features of phased array 20 that may affect the array temperature. The features may be described for temperatures and/or frequencies at which antenna elements 26 may be expected to operate. Examples of array feature data 60 may include operational parameters, component parameters, and/or calibration settings.

Operational state parameters may describe features of the operation of phased array 20 that may affect the array temperature. Examples of operational state parameters may include initial array temperature, operation time, operation mode, duty factor, input power, output power, efficiency, frequency, pulse width, mode, duration of modes, power supply level, and/or other parameters. Examples of operation modes include a transmit mode, a receive mode, a polarization mode, and/or other mode. Operational state parameters may change in response to the operational state.

Component parameters may describe features of the components of phased array 20 that may affect the array temperature. The features may describe how well the components dissipate and/or absorb heat. Examples of component parameters may include component thermal mass, radome material, number and/or location of failed antenna elements 26, and/or other component features.

Calibration settings may refer to settings to compensate for temperature independent factors such as manufacturing and component variability. In one embodiment, the initial calibration settings may be collected over a period of time when the array is in a steady state condition that represents the start-up operating conditions of the array. Under start-up conditions, the array may experience relatively small temperature change from a non-operating state.

Calibration settings may include calibration values that represent adjustments of a signal feature such as a signal phase and/or a signal amplitude. For example, a calibration value for an antenna element 26 may instruct a phase shifter of antenna element 26 to shift a phase by negative ten degrees. The calibration settings may be provided for different frequencies and/or operating modes. The calibration values may be associated with each element in the array and stored at the array.

Conditions data 62 may describe current conditions at phased array 20 that may affect the array temperature, and may be received from one or more sensors. Sensors may be located at any suitable location of system 10, such as the radome, array 20, array elements 26, array mechanical interface, attachment points, power supplies, and/or batteries. Conditions data 62 may be associated with timing information that indicates when conditions data 62 is relevant.

Examples of conditions data 62 may include current environmental conditions and current operating conditions. Examples of current environmental conditions may include temperature data (such as temperature sensor data and/or external heating data) that describes the temperature of phased array 20, the external temperature, the motion of fluids (such as air or water) around phased array 20, and/or the speed and/or acceleration of a projectile carrying phased array 20. Examples of current operating conditions may include operating mode data (or element operation state data), such as a transmit on time, the duty factor for transmit or receive, the receive on time, and/or the time and frequency of operation. The data may be time stamped.

Temperature model 64 represents a model of the temperature of antenna elements 26 in particular conditions. According to one embodiment, temperature model 64 includes an element phase/gain temperature model, element phase/gain temperature data, and/or array temperature model parameters.

In one embodiment, temperature model 64 may be used to determine current or future temperature values in accordance with temperature-affecting parameters 58. In general, a value represents an absolute value or a change. For example, a temperature value may represent an absolute temperature or a change in temperature.

A model may have any suitable format to allow output to be generated from input. According to one embodiment, a model may include mappings. For example, a model may map a parameter to a temperature value. According to another embodiment, a model may have rules. In general, a rule may be used to determine the output from the input. Examples of rules include conditional statements, mathematical functions or formulas, mappings, and/or algorithms.

Correction rules 68 may be used to determine temperature-dependent correction values from temperature values. A temperature-dependent correction value may refer to a correction value that is used to compensate for temperature changes at phased array 20. A correction value may be used to correct a signal feature, for example, an amplitude or phase. The correction value may represent an absolute signal feature (such as an absolute gain) or a change in a signal feature (such as a change in gain). According to one embodiment, correction rules 68 may include mappings that map a particular temperature value to a correction value. For example, a thirty degree increase in temperature may be mapped to a negative ten degrees phase shift. According to one embodiment, correction rules 68 may include array calibration data and/or beam position data.

Logic 54 may process information by receiving input and executing instructions to generate output from the input. Logic 54 may include hardware, software, other logic, or any suitable combination of any of the preceding. According to the illustrated embodiment, logic 54 includes a processor 70 and applications 74. Processor 70 may manage the operation of controller 24. Examples of a processor may include one or more computers, one or more microprocessors, one or more applications, other logic operable to manage the operation of a component, or any suitable combination of any of the preceding.

Applications 74 includes temperature calculator 80, a correction value calculator 84, and a beam steering calculator 86. Temperature calculator 80 may determine the temperature at a set of one or more antenna elements 26. According to one embodiment, temperature calculator 80 may determine the temperature from sensor readings from a sensing sending the antenna elements 26. According to another embodiment, temperature calculator 80 may calculate the temperature in accordance with temperature-affecting parameters 58 and/or temperature model 64. The temperature at a current time may be determined or the temperature at a future time may be predicted.

Temperature calculator 80 may calculate the temperature according to any suitable function. In one example, temperature may be calculated according to:

$$T_i^{k+1} = T_i^k + \frac{Q_i}{C_i}\Delta t + \sum \beta_j T_j^k + \sum \alpha_e T_e^k$$

where $T_i^k$ represents the temperature of component i at time k, $Q_i$ represents component dissipation, $C_i$ represents the thermal capacitance term of component i, $Q_i/C_i$ represents the self-heating temperature rise, $T_j$ represents the temperature of other components, $\beta_j$ represents a weighting factor for the influence of the temperature $T_j$ of other components on temperature $T_i^k$, $T_e$ represents the environmental temperature, and $\alpha_e$ represents a weighting factor for the influence of the temperature $T_e$ on $T_i^k$. The weighting factors $\beta_j$ and $\alpha_e$ may take into account a time lag.

Correction value calculator 84 may determine correction values in response to the conditions at phased array 20. According to one embodiment, correction value calculator 84 may calculate a change that occurs at a particular a temperature value. The change may be a gain (such as an average transmit/receive channel gain) and/or phase change. Correction value calculator 84 may then calculate a correction value that compensates for the change according to, for example, correction rules 68.

According to one embodiment, the correction value may be determined from a calibration value and a temperature-dependent correction value. The correction value may be calculated by adding the calibration value and the temperature-dependent correction value. For example, a calibration value may represent a negative ten degrees phase shift, and a temperature-dependent correction value may represent a negative five degrees phase shift. The correction value may be calculated as a negative fifteen degrees phase shift.

Beam steering calculator 86 provides a desired beam orientation for operational needs, such as target tracking. Correction value calculator 84 may adjust the correction values based on the desired beam orientation.

Modifications, additions, or omissions may be made to controller 24 without departing from the scope of the invention. The components of controller 24 may be integrated or separated. Moreover, the operations of controller 24 may be performed by more, fewer, or other components. Additionally, operations of controller 24 may be performed using any suitable logic.

Figure 3:
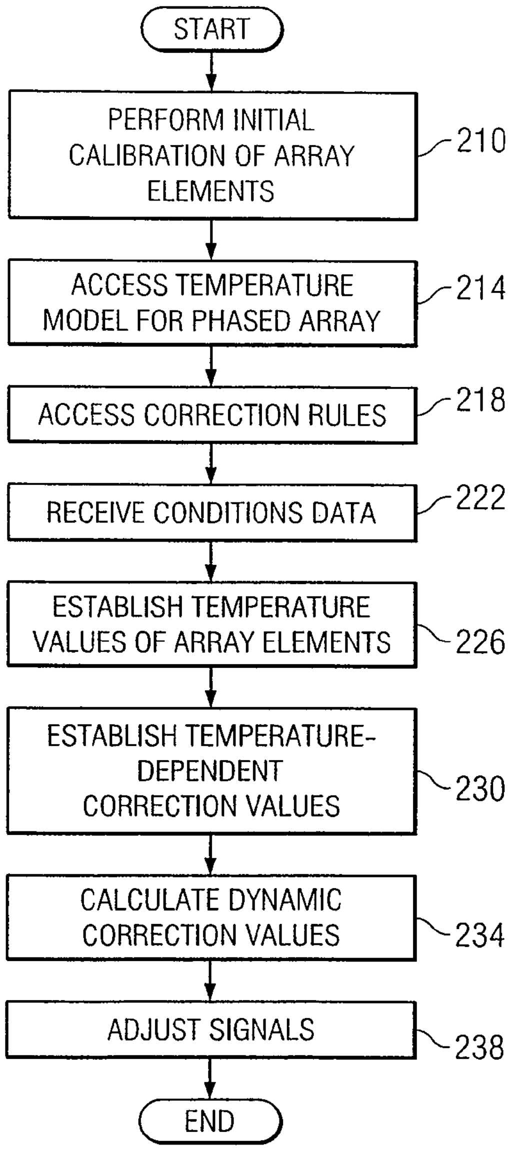
FIG. 3 illustrates one embodiment of a method for adjusting a calibrated phased array that may be used with the system of FIG. 1.

FIG. 3 illustrates one embodiment of a method for adjusting a calibrated phased array 20 that may be used with system 10 of FIG. 1. The method starts at step 210, where calibration is performed. The calibration may be performed at an ambient temperature and/or a low duty cycle to yield calibration values that compensate for manufacturing and/or component variability.

Temperature model 64 is accessed at step 214. Temperature model 64 may be used to determine temperature values for phase array 20 under particular conditions. Correction rules 68 are accessed at step 218. Correction rules 68 may be used to determine temperature-dependent correction values from temperature values. Conditions data 62 is received at step 222. Conditions data 62 may describe current conditions at phased array 20 that may affect the array temperature.

Temperature values of array elements 26 are established at step 226. Temperature calculator 80 may calculate the temperature of a set of one or more antenna elements 26 in accordance with temperature-affecting parameters 58, such as conditions data 62 and/or temperature model 64.

Temperature-dependent correction values are established at step 230. Correction value calculator 84 may calculate a gain and/or phase change that occurs at a particular a temperature value, and then calculate a temperature-dependent correction value that compensates for the change according to correction rules 68.

Correction values are calculated at step 334. Correction value calculator 84 may calculate the correction values from the calibration values and the temperature-dependent correction values.

The signals are adjusted at step 338. Phase shifter and/or amplifiers may be used to adjust the signals feeding antenna elements 26 according to the correction values. After adjusting the signals, the method ends.

Modifications, additions, or omissions may be made to the method without departing from the scope of the invention. The method may include more, fewer, or other steps. Additionally, steps may be performed in any suitable order.

Figure 4:
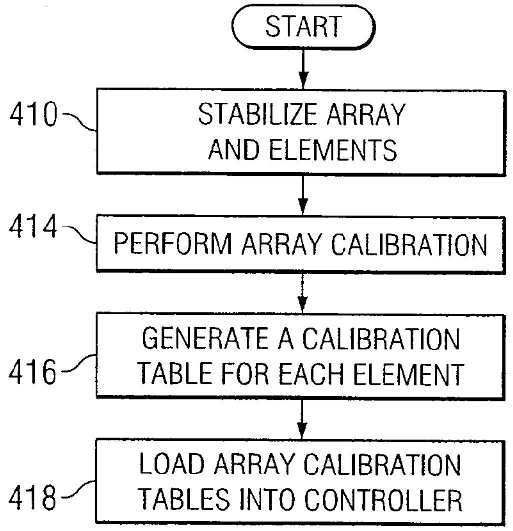
FIG. 4 illustrates one embodiment of a method for calibrating a phased array that may be used with the system of FIG. 1.

FIG. 4 illustrates one embodiment of a method for calibrating phased array 20 that may be used with system 10 of FIG. 1. The method starts at step 410, where array 20 and elements 26 are stabilized at a predetermined start temperature. Array calibration is performed at step 414. The array calibration may be performed element 26 by element 26 at a low duty factor to minimize temperature rise. A calibration table is generated for each element 26 at step 416. The tables may be generated as a function of frequency, more, or other feature. The calibration tables are loaded into array 20 at step 418. The method then ends.

Modifications, additions, or omissions may be made to the method without departing from the scope of the invention. The method may include more, fewer, or other steps. Additionally, steps may be performed in any suitable order.

Figure 5:
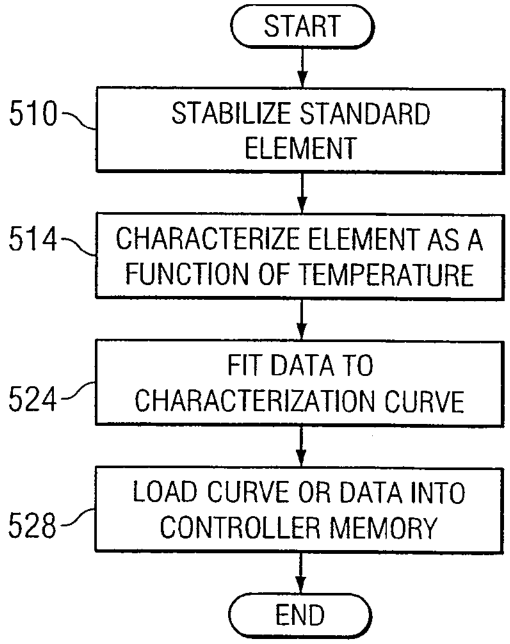
FIG. 5 illustrates one embodiment of a method for characterizing the element temperature of a phased array that may be used with the system of FIG. 1.

FIG. 5 illustrates one embodiment of a method for characterizing the element response to temperature changes of phased array 20 that may be used with system 10 of FIG. 1. The method starts at step 510, where the standard element 26 is stabilized at a predetermined array start temperature.

Element 26 is characterized as a function of temperature at step 514. In one embodiment, a performance table may be generated. The performance table may include gain and phase shift changes as a function of element temperature. An element data table may be generated as a function of frequency, mode, or other feature. Data is fit to a characterization curve at step 524. The curve or data is loaded into to controller memory 52 at step 528. The method then ends.

Modifications, additions, or omissions may be made to the method without departing from the scope of the invention. The method may include more, fewer, or other steps. Additionally, steps may be performed in any suitable order.

Figure 6:
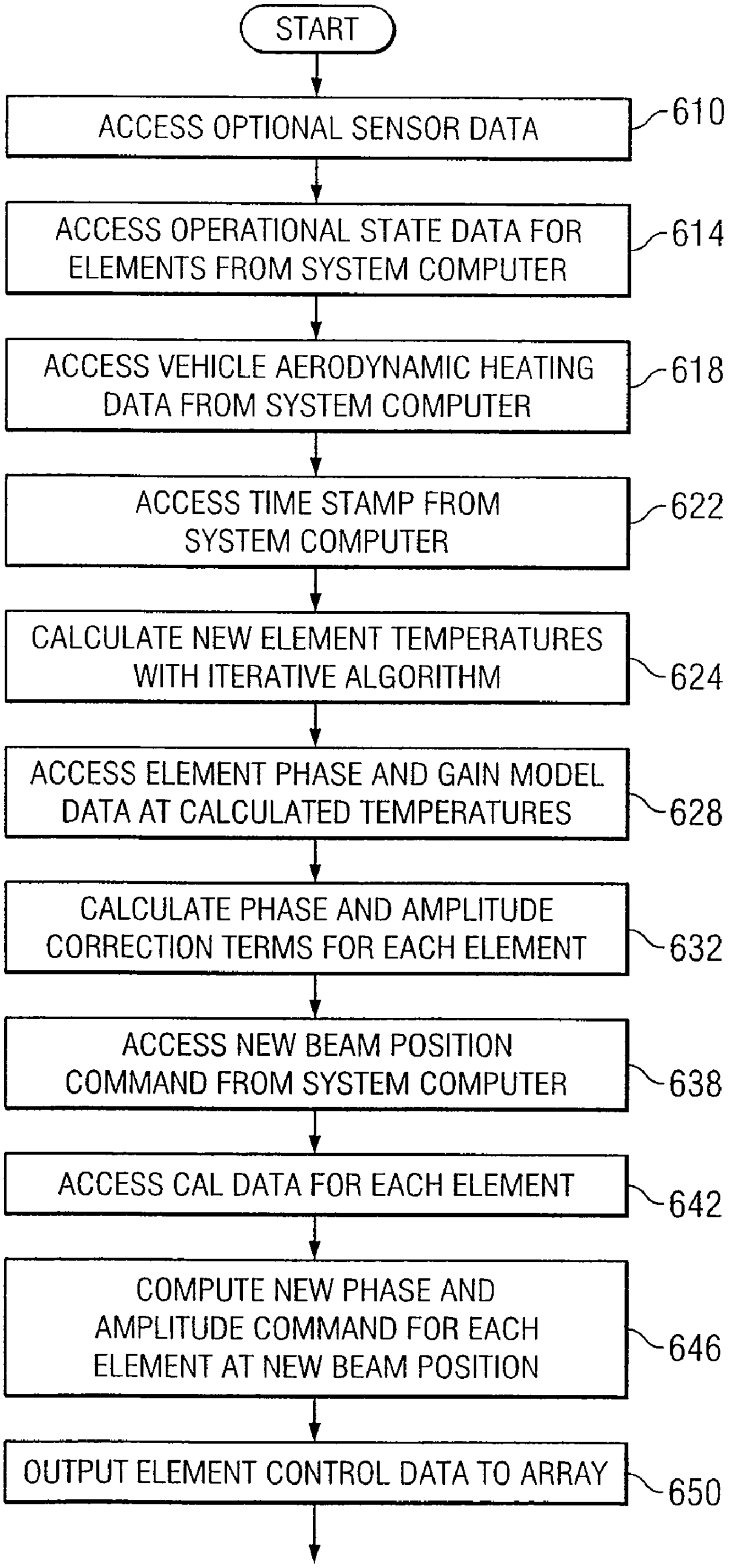
FIG. 6 illustrates one embodiment of a method for adjusting calibration of a phased array that may be used with the system of FIG. 1.

FIG. 6 illustrates one embodiment of a method for adjusting calibration of phased array 20 that may be used with system 10 of FIG. 1. The method starts at step 610, where optional sensor data is accessed. Operational state data for elements is accessed at step 614. Aerodynamic heating data may be accessed at step 618. Controller 24 may provide the aerodynamic heating data according to the time history of operation and the atmospheric conditions. Time stamp data is accessed at step 622. The time stamp data may be used to determine elapsed time since the last adjustment and the last coordination with mission objectives. New element temperatures are calculated at step 624. Element phase and gain data at the temperatures calculated at step 624 are accessed at step 628.

Phase and amplitude correction terms are calculated for each element at step 632. New beam position command is accessed at step 638. Calibration data for each element is accessed at step 642. New phase and amplitude command is calculated for each element at new beam position at step 646. Element control data is output to array 20 at step 650. The method then ends.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that calibrated antenna elements of a phased array may be adjusted in accordance with current conditions at the phased array. In the embodiment, the conditions may include the temperature of the antenna elements. The temperature may be predicted from a model of the phased array and/or may be measured using a sensor sensing the phased array.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for adjusting a calibrated phased array, comprising:

receiving conditions data describing one or more conditions at a phased array, the phased array comprising a plurality of antenna element sets, an antenna element set comprising one or more antenna elements, an antenna element set associated with a calibration value;

performing the following for each antenna element set of the plurality of antenna element sets:

establishing a temperature value for the each antenna element set according to the conditions data by calculating the temperature value from a previously calculated temperature value of the each antenna element;

establishing a temperature-dependent correction value corresponding to the temperature value;

determining a correction value for the each antenna element set according to the temperature-dependent correction value and the calibration value associated with the each antenna element set; and adjusting at least one antenna element of the each antenna element set according to the correction value.

2. The method of claim 1, wherein adjusting the at least one antenna element further comprises:

adjusting a signal feature of a signal feeding the at least one antenna element, the signal feature comprising either a signal phase or a signal amplitude.

3. The method of claim 1, further comprising performing calibration by:

adjusting a signal feature of a signal feeding an antenna element of an antenna element set according to the calibration value associated with the antenna element set.

4. The method of claim 1, wherein establishing the temperature value for each antenna element set further comprises:

establishing the temperature value for a current time according to a temperature model.

5. The method of claim 1, wherein establishing the temperature value for each antenna element set further comprises:

predicting the temperature value for a future time according to a temperature model.

6. The method of claim 1, wherein establishing the temperature value for each antenna element set further comprises:

establishing the temperature value according to a sensor reading from a sensor sensing the each antenna set.

7. The method of claim 1, wherein establishing the temperature value for each antenna element set further comprises:

establishing the temperature value according to the conditions data and array feature data.

8. The method of claim 1, wherein establishing the temperature-dependent correction value further comprises:

establishing the temperature-dependent correction value according to a rule associating the temperature-dependent correction value with the each temperature value.

9. The method of claim 1, wherein determining the correction value for the each antenna element set according to the temperature-dependent correction value and the calibration value associated with the each antenna element set further comprises:

adding the temperature-dependent correction value and the calibration value.

10. A system for adjusting a calibrated phased array, comprising:

a memory operable to:

store conditions data describing one or more conditions at a phased array, the phased array comprising a plurality of antenna element sets, an antenna element set comprising one or more antenna elements, an antenna element set associated with a calibration value; and one or more processors coupled to the memory and operable to perform the following for each antenna element set of the plurality of antenna element sets:

establish a temperature value for the each antenna element set according to the conditions data by calculating the temperature value from a previously calculated temperature value of the each antenna element;

establish a temperature-dependent correction value corresponding to the temperature value;

determine a correction value for the each antenna element set according to the temperature-dependent correction value and the calibration value associated with the each antenna element set; and adjust at least one antenna element of the each antenna element set according to the correction value.

11. The system of claim 10, the one or more processors further operable to adjust the at least one antenna element by:

adjusting a signal feature of a signal feeding the at least one antenna element, the signal feature comprising either a signal phase or a signal amplitude.

12. The system of claim 10, the one or more processors further operable to perform calibration by:

adjusting a signal feature of a signal feeding an antenna element of an antenna element set according to the calibration value associated with the antenna element set.

13. The system of claim 10, the one or more processors further operable to establish the temperature value for each antenna element set by:

establishing the temperature value for a current time according to a temperature model.

14. The system of claim 10, the one or more processors further operable to establish the temperature value for each antenna element set by:

predicting the temperature value for a future time according to a temperature model.

15. The system of claim 10, the one or more processors further operable to establish the temperature value for each antenna element set by:

establishing the temperature value according to a sensor reading from a sensor sensing the each antenna set.

16. The system of claim 10, the one or more processors further operable to establish the temperature value for each antenna element set by:

establishing the temperature value according to the conditions data and array feature data.

17. The system of claim 10, the one or more processors further operable to establish the temperature-dependent correction value by:

establishing the temperature-dependent correction value according to a rule associating the temperature-dependent correction value with the each temperature value.

18. The system of claim 10, the one or more processors further operable to determine the correction value for the each antenna element set according to the temperature-dependent correction value and the calibration value associated with the each antenna element set by:

adding the temperature-dependent correction value and the calibration value.

19. A system for adjusting a calibrated phased array, comprising:

means for receiving conditions data describing one or more conditions at a phased array, the phased array comprising a plurality of antenna element sets, an antenna element set comprising one or more antenna elements, an antenna element set associated with a calibration value;

means for performing the following for each antenna element set of the plurality of antenna element sets:

establishing a temperature value for the each antenna element set according to the conditions data by calculating the temperature value from a previously calculated temperature value of the each antenna element;

establishing a temperature-dependent correction value corresponding to the temperature value;

determining a correction value for the each antenna element set according to the temperature-dependent correction value and the calibration value associated with the each antenna element set; and adjusting at least one antenna element of the each antenna element set according to the correction value.

20. A system for adjusting a calibrated phased array, comprising:

a memory operable to:

store conditions data describing one or more conditions at a phased array, the phased array comprising a plurality of antenna element sets, an antenna element set comprising one or more antenna elements; and one or more processors coupled to the memory and operable to:

perform calibration by adjusting a signal feature of a signal feeding an antenna element of an antenna element set according to a calibration value;

establish a temperature value for each antenna element set according to the conditions data to yield a plurality of temperature values by calculating the temperature value from a previously calculated temperature value of the each antenna element;

determine a correction value for each temperature value of one or more temperature values to yield one or more correction values by:

establishing a temperature-dependent correction value according to a rule associating the temperature-dependent correction value with the each temperature value; and determining the correction value according to a calibration value and the temperature-dependent correction value; and adjust at least one antenna element of one or more antenna element sets according to the one or more correction values by:

adjusting a signal feature of a signal feeding the at least one antenna element, the signal feature comprising either a signal phase or a signal amplitude.

* * * * *